United States Patent [19]

Distaso

[11] Patent Number: 5,405,548

[45] Date of Patent: Apr. 11, 1995

[54] METHYLBENZYL FORMATE PAINT STRIPPERS

[75] Inventor: John Distaso, Orange, Calif.

[73] Assignee: Elf Atochem North America Inc., Philadelphia, Pa.

[21] Appl. No.: 282,130

[22] Filed: Jul. 28, 1994

Related U.S. Application Data

[60] Division of Ser. No. 92,046, Jul. 15, 1993, Continuation-in-part of Ser. No. 32,824, Mar. 17, 1993, which is a continuation of Ser. No. 777,865, Oct. 16, 1991, abandoned, which is a continuation-in-part of Ser. No. 647,860, Nov. 30, 1991, abandoned.

[51] Int. Cl.[6] .......................... C11D 7/50; C11D 3/20; B08B 3/04
[52] U.S. Cl. ..................... 252/170; 252/173; 252/143; 252/DIG. 8; 252/364; 134/38
[58] Field of Search .............. 252/170, 173, 174.18, 252/142, 143, DIG. 8, 364; 134/38

[56] References Cited

U.S. PATENT DOCUMENTS

| 1,169,783 | 2/1916  | Ellis .................. 252/DIG. 8 |
| 3,150,048 | 9/1964  | Hoilub et al. ............ 167/85 |
| 4,448,713 | 5/1984  | Boden ................ 252/174.11 |
| 4,545,925 | 10/1985 | Bosen et al. ............ 252/389 |
| 4,632,770 | 12/1986 | Slanker ................. 252/49.5 |
| 4,732,695 | 3/1988  | Francisco ............... 252/162 |
| 4,767,554 | 8/1988  | Malito et al. ........... 242/49.5 |
| 4,812,255 | 3/1989  | Suwala .................. 252/142 |
| 5,128,065 | 7/1992  | Hollander ............... 252/394 |
| 5,215,675 | 6/1993  | Wilkins et al. .......... 252/100 |

FOREIGN PATENT DOCUMENTS 256084 11/1988 Czechoslovakia .
3438399 4/1986 Germany .
1602187 11/1981 United Kingdom .

Primary Examiner—Paul Lieberman
Assistant Examiner—Gregory R. Delcotto
Attorney, Agent, or Firm—Stanley A. Marcus; William D. Mitchell

[57] ABSTRACT

Aqueous paint stripper formulations containing a solvent system comprised of an ester such as benzyl formate and methods for using the same to strip paint.

18 Claims, No Drawings

METHYLBENZYL FORMATE PAINT STRIPPERS

This is a divisional of copending application 08/092,046, filed Jul. 15, 1993.

CROSS-REFERENCE TO RELATED APPLICATIONS

This is a continuation-in-part of application Ser. No. 08/032,824, filed Mar. 17, 1993, which in turn is a continuation of application Ser. No. 07/777,865, filed Oct. 16, 1991 (now abandoned), which in turn is a continuation-in-part of application Ser. No. 07/647,860, filed Jan. 30, 1991 (now abandoned).

FIELD OF THE INVENTION

This invention relates to compositions for paint removal without the use of chlorinated solvents such as methylene chloride, especially paint stripper formulations containing a benzyl ester such as benzyl formate.

BACKGROUND

Health and environmental concerns are causing the limiting and/or obsoleting of the use of the heretofore classic thixotropic paint strippers based upon chlorinated solvents. However, solvent-based strippers employing solvents other than chlorinated materials have thus far not been wholly successful in removing today's paint/primer films (e.g., polyurethane, epoxy, and alkyd paints). Further, the preferred ester solvent of this invention (benzyl formate) would have heretofore been considered too expensive to warrant consideration as a replacement for chlorinated solvents.

SUMMARY OF THE INVENTION

A paint stripper formulation is provided (together with its use for stripping paint) containing (a) a solvent system (typically about 25 to 88 parts by weight) based on an ester having the formula HC(O)OR, where R is selected from benzyl and methylbenzyl, preferably a system containing the ester together with an alcohol of the formula ROH and formic acid in which latter event there is typically about 1 to 10 parts (preferably about 2 to 5 parts) each of the acid and the ester for each 5 parts of the alcohol, and (b) water (typically about 5 to 75 parts by weight). R is preferably benzyl. In order to make the use of the preferred benzyl formate ester economically attractive, the ester is preferably formed in situ from the corresponding (benzyl) alcohol and (formic) acid.

Depending on the intended end-use, the formulations normally also contain other conventional additives such thickeners, dispersants, surfactants, and/or corrosion inhibitors.

DETAILED DESCRIPTION OF INVENTION

It has now been found that the expensive benzyl formate ester is formed when the corresponding relatively inexpensive benzyl alcohol is reacted with formic acid. Further, it has been found that the reaction solution containing the formate, alcohol, and acid is a superior solvent to either the alcohol or the formate alone. Optimum results occur when the amount (by weight) of alcohol exceeds that of the ester and when the formulation contains at least about 30 percent by weight of water. Before adding water to the formulation, premixing of the other ingredients is desirable to allow the alcohol, acid, and ester to reach equilibrium conditions.

In contrast to the foregoing, when acetic acid was substituted for formic acid, an ester could not be formed unless the reaction was driven with a catalyst. Further, as shown below, the subject benzyl formate/benzyl alcohol/formic acid formulations were found to strip polyurethane and epoxy paint systems more than three times as fast as equivalent benzyl acetate/benzyl alcohol/acetic acid formulations.

Other suitable esters are those derived by starting with methylbenzyl alcohol instead of benzyl alcohol, including all four methylbenzyl isomers (alpha, ortho, meta, and para).

Conventional additives added to the formulations include one or more of the following: thickeners (such as hydroxypropyl methyl cellulose, hydroxyethyl cellulose or xanthan gum); dispersants (or solubilization agents) such as propylene glycol, sodium polymethacrylate (available from W. R. Grace under the tradename "Daxad 30"), or sodium xylene sulfonate; surfactants such as the amphoteric surfactants (e.g., imidazolines) or ethoxylated nonylphenol (available from G.A.F. under the tradename Igepal CO-630"); corrosion inhibitors such as 2-mercaptobenzotriazole or toluene triazole; and mineral oil (to prevent evaporation). For viscous (vertical cling-type) strippers applied by spraying or brushing, up to about 75% water may be present (percent by weight, based on the weight of the total composition), while thin (immersion tank type) strippers may have up to about 50% water. The water is preferably deionized.

Typical compositions would be comprised of about 25 to 88 parts by weight of the solvent system, 0 to 4 parts thickeners, 0 to 15 parts dispersants, 0 to 9 parts surfactants, 0 to 4 parts corrosion inhibitors, 0 to 22 parts mineral oil, and from about 5 to about 75 parts water (preferably about 30–50 parts for faster stripping). Examples of useful compositions of this invention (Example Nos. 1–4) are presented below (all parts being by weight), along with a comparative example (Nos. C1) with acetic acid and benzyl acetate in place of formic acid and benzyl formate:

| Ingredient | Parts Added | Parts At Equilibrium |
|---|---|---|
| Example 1. Cling-Type Stripper: | | |
| benzyl alcohol | 35.0 | 25.0 |
| formic acid | 11.0 | 7.0 |
| hydroxypropyl methyl cellulose ("HMC") | 0.8 | 0.8 |
| propylene glycol ("PG") | 3.0 | 3.0 |
| 2-mercaptobenzothiazole ("2MBT") | 0.7 | 0.7 |
| Daxad 30 | 2.0 | 2.0 |
| deionized water | 47.5 | 49.0 |
| benzyl formate | 0.0 | 12.5 |
| Example 2. Cling-Type Stripper with Less Water: | | |
| benzyl alcohol | 35.0 | 21.2 |
| formic acid | 11.0 | 4.9 |
| HMC | 0.8 | 0.8 |
| PG | 3.0 | 3.0 |
| 2MBT | 0.7 | 0.7 |
| Daxad 30 | 2.0 | 2.0 |
| deionized water | 24.0 | 26.5 |
| benzyl formate | 0.0 | 17.4 |
| Example 3. No Added Water: | | |
| benzyl alcohol | 35.0 | 14.2 |
| (90%) formic acid | 12.0 | 1.9 |
| HMC | 0.8 | 0.8 |
| PG | 3.0 | 3.0 |
| 2MBT | 0.7 | 0.7 |
| Daxad 30 (none added since no water to disperse) | 0.0 | 0.0 |
| deionized water | 0.0 | 4.7 |

-continued

| Ingredient | Parts Added | Parts At Equilibrium |
|---|---|---|
| benzyl formate | 0.0 | 26.2 |
| Comparative C1. Benzyl Acetate/Acetic Acid: | | |
| acetic acid (in place of formic acid) | 7.0 | |
| benzyl acetate (in place of benzyl formate) | 12.5 | |
| (remainder of formula identical to Example 1 formula) | | |
| Example 4. Immersion-Type Stripper: | | |
| benzyl alcohol | 18.0 | 10.6 |
| benzyl formate | 0.0 | 9.3 |
| formic acid | 13.0 | 9.9 |
| water | 47.5 | 48.7 |
| sodium xylene sulfonate | 11.0 | 11.0 |
| 2MBT | 0.5 | 0.5 |
| mineral oil | 10.0 | 10.0 |

Comparative stripping tests were run on the invention formulations of Examples 1–3 and on the Comparative formulation C1 following MIL-R-81294D (except that 3×6 inch aluminum clad panels were used instead of 6×15 inch panels), a military specification used to evaluate the effectiveness of paint strippers to remove a white polyurethane paint and a gray epoxy paint (typical of what is in use by the Air Force and Navy) from aluminum. The first of these tests compared Example 1 to Comparative C1 since the formulations are identical except that C1 uses acetic acid and benzyl acetate in place of the formic acid and the benzyl formate of the invention Example 1 formulation. The average times to completely strip the polyurethane and epoxy paints are set forth in Table I below, the averages being obtained by running 5 sections, throwing out the high and low times, and averaging the remaining 3 times (in the case of the use of C1 to strip the epoxy, however, one section only 85% stripped was considered to be 100% stripped in order to give a third data point for averaging purposes):

TABLE I

| | Time to Strip: | |
|---|---|---|
| | Polyurethane Paint | Epoxy Paint |
| Example 1 | 135 minutes | 109 minutes |
| Comp. C1 | did not strip in 8 hours | 360 minutes |

A second test following the same procedure compared invention Examples 1–3 to demonstrate that adding water has a beneficial effect on stripping. Results showed that Example 1 gave slightly faster stripping times than Example 2 with both epoxy and polyurethane, while Example 3, though clearly superior to C1, was nearly twice as slow in stripping epoxy and did a less thorough stripping of the polyurethane.

What is claimed is:

1. A paint stripper formulation containing (a) from about 25 to about 88 parts by weight, based on the weight of the formulation, of a solvent system comprising an ester having the formula HC(O)OR, an alcohol having the formula ROH, and formic acid, where R is methylbenzyl, there being about 1 to 10 parts by weight each of the acid and the ester for each 5 parts by weight of the alcohol, and (b) from about 5 to about 75 parts by weight of water.

2. A formulation as in claim 1 wherein R is derived from one or more of alpha or ortho or meta or para methylbenzyl alcohol.

3. A formulation as in claim 2 wherein the ester is formed in situ from said alcohol and acid.

4. A formulation as in claim 3 containing about 30 to 50 parts by weight of water.

5. A paint stripper formulation containing (a) from about 25 to about 88 parts by weight, based on the weight of the formulation, of a solvent system to strip polyurethane and epoxy paint systems comprising an ester having the formula HC(O)OR where R is methyl benzyl, (b) from about 5 to about 75 parts by weight of water, and (c) at least a thickening agent and a corrosion inhibitor.

6. A formulation as in claim 5 wherein the thickening agent is hydroxypropyl methylcellulose and the corrosion inhibitor is 2-mercaptobenzothiazole.

7. A paint stripper formulation comprising methylbenzyl formate, methylbenzyl alcohol, a thickening agent selected from the group of hydroxypropyl methylcellulose and hydroxypropyl cellulose and xanthan gum, formic acid and from 5 to 75 parts by weight water based on the total weight of the formulation.

8. The paint stripper formulation of claim 7 comprising 25 to 88 parts by weight of methylbenzyl formate and methyl benzyl alcohol as a solvent system and at least one corrosion inhibitor.

9. The paint stripper formulation of claim 8 where the corrosion inhibitor is 2-mercaptobenzotriazole or toluene triazole.

10. The paint stripper formulation of claim 9 where the thickening agent is hydroxypropyl methylcellulose.

11. The paint stripper formulation of claim 7 where the methylbenzyl formate is formed in situ by the reaction of formic acid with one or more of the alpha or ortho or meta or para isomers of methylbenzyl alcohol.

12. The paint stripper formulation of claim 7 comprising 30 parts by weight or more water.

13. The paint stripper formulation of claim 12 further comprising one or more of propylene glycol, sodium polymethacrylate, sodium xylene sulfonate, 2-mercaptobenzothiazole and benzyl formate.

14. A paint stripper formulation for polyurethane and epoxy paint systems comprising a solvent system of formic acid, methylbenzyl alcohol and methylbenzyl formate and from 5 to 75 parts by weight water based on the total weight of the formulation.

15. The paint stripper formulation of claim 14 further comprising a thickener and a corrosion inhibitor.

16. The paint stripper formulation of claim 15 comprising at least 30 parts by weight water.

17. The paint stripper formulation of claim 16 where the solvent system comprises formic acid and methylbenzyl alcohol and methylbenzyl formate.

18. The paint stripper formulation of claim 17 formed in situ.

* * * * *